Figure 1:
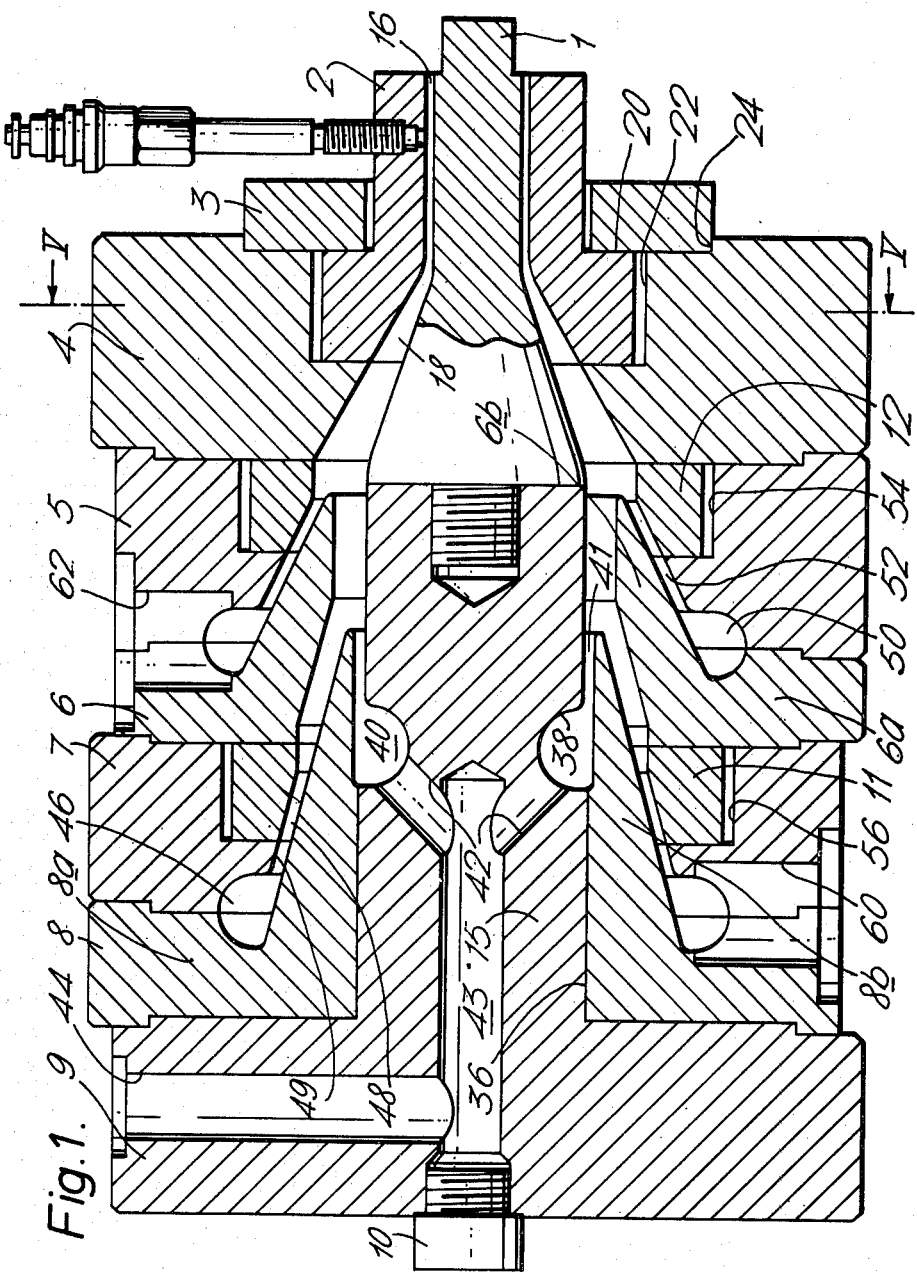

United States Patent [19]

Nash

[11] 4,365,949

[45] Dec. 28, 1982

[54] CO-EXTRUSION DIE APPARATUS FOR CO-EXTRUDING PLASTICS MATERIALS

[75] Inventor: David D. Nash, Brownhills, England

[73] Assignee: Durapipe Limited, Cannock, England

[21] Appl. No.: 137,472

[22] Filed: Apr. 4, 1980

[30] Foreign Application Priority Data

Apr. 6, 1979 [GB] United Kingdom ............... 7912286

[51] Int. Cl.³ .................... B29D 23/04; B29D 9/00; B29F 3/04
[52] U.S. Cl. ................................ 425/463; 264/173; 425/466; 425/467
[58] Field of Search ............... 264/173; 425/466, 467, 425/463

[56] References Cited

U.S. PATENT DOCUMENTS

| | | | |
|---|---|---|---|
| 3,023,461 | 3/1962 | Sherman | 264/173 X |
| 3,365,750 | 1/1968 | Donald | 425/466 X |
| 3,837,773 | 9/1974 | Raley | 264/173 X |
| 3,860,372 | 1/1975 | Newman | 425/466 X |
| 4,038,017 | 7/1977 | Langecker | 425/466 |
| 4,047,868 | 9/1977 | Kudo et al. | 425/466 X |
| 4,111,630 | 9/1978 | Shiomi et al. | 425/466 X |
| 4,125,585 | 11/1978 | Rosenbaum | 264/173 |
| 4,134,952 | 1/1979 | Yoshikawa et al. | 264/173 |
| 4,185,954 | 1/1980 | Murakami et al. | 425/466 X |
| 4,208,178 | 6/1980 | Przytulla | 425/467 |
| 4,276,250 | 6/1981 | Satchell et al. | 425/463 X |

FOREIGN PATENT DOCUMENTS 2142752 2/1973 France ........................... 264/173

Primary Examiner—Philip E. Anderson
Attorney, Agent, or Firm—Klarquist, Sparkman, Campbell, Leigh, Whinston & Dellett

[57] ABSTRACT

Apparatus for extrusion of a plastics pipe, comprising a plurality of different layers is disclosed, including an extrusion die having a base-plate with a mandrel extending therefrom, a stack of five annular die plates secured to the base plate and defining with the mandrel an annular extrusion passage leading to an annular extrusion outlet. Three annular plenum chambers defined respectively between the mandrel and the rearwardmost plate and between adjoining said plates lead into the annular extrusion passage upstream of the extrusion opening. Equalization rings and a front die member are adjustable diametrally with respect to the mandrel to adjust the concentricity of the different layers in the pipe produced. Molten plastics material may be fed from a single source to the rearwardmost and the forwardmost plenum chamber feeding the material for the inner and outer layers of the pipe via a distributor having separate flow adjusters for each of two conduits connectable with the rearwardmost and forwardmost plenum chambers.

8 Claims, 8 Drawing Figures

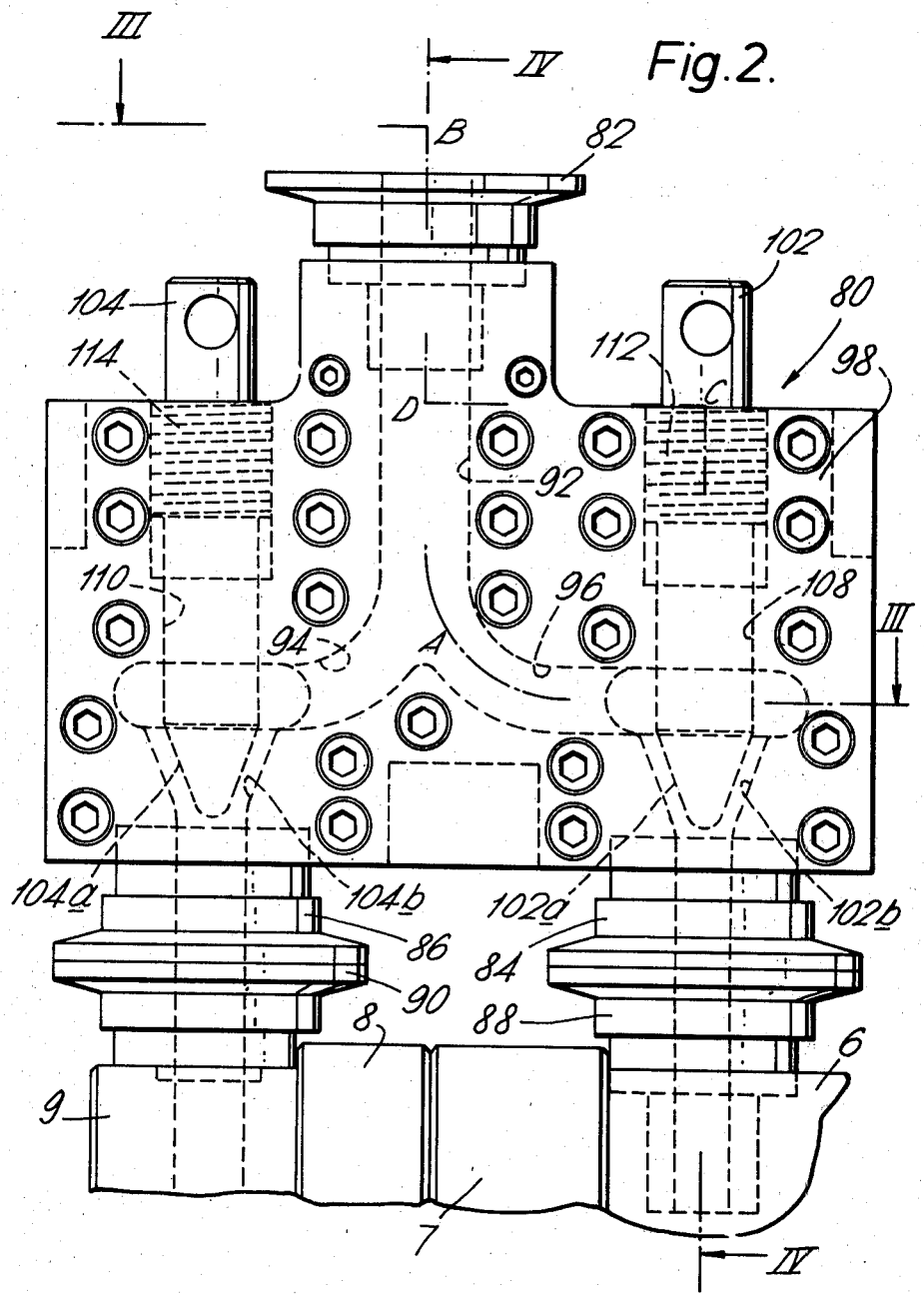

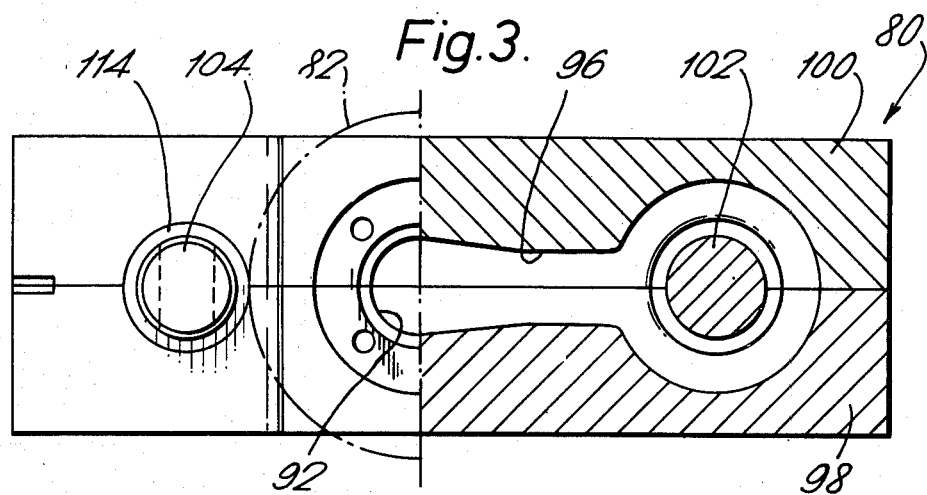
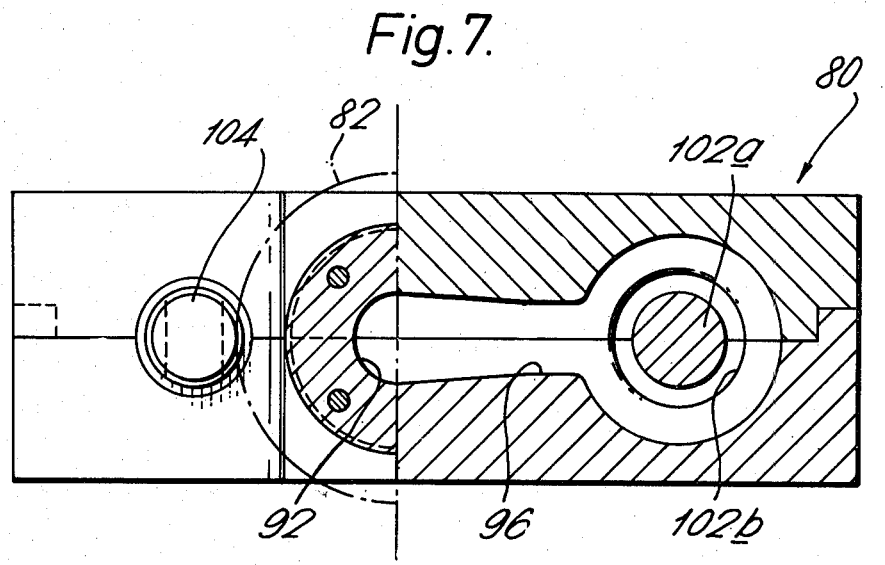

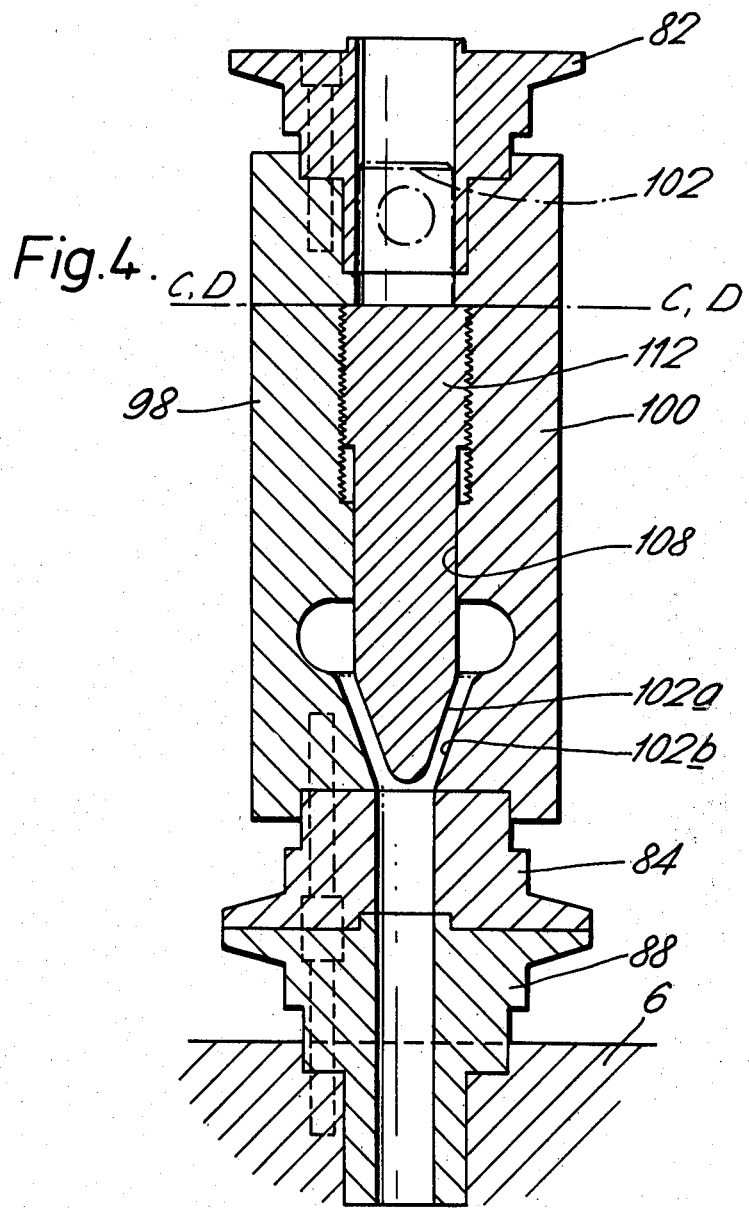

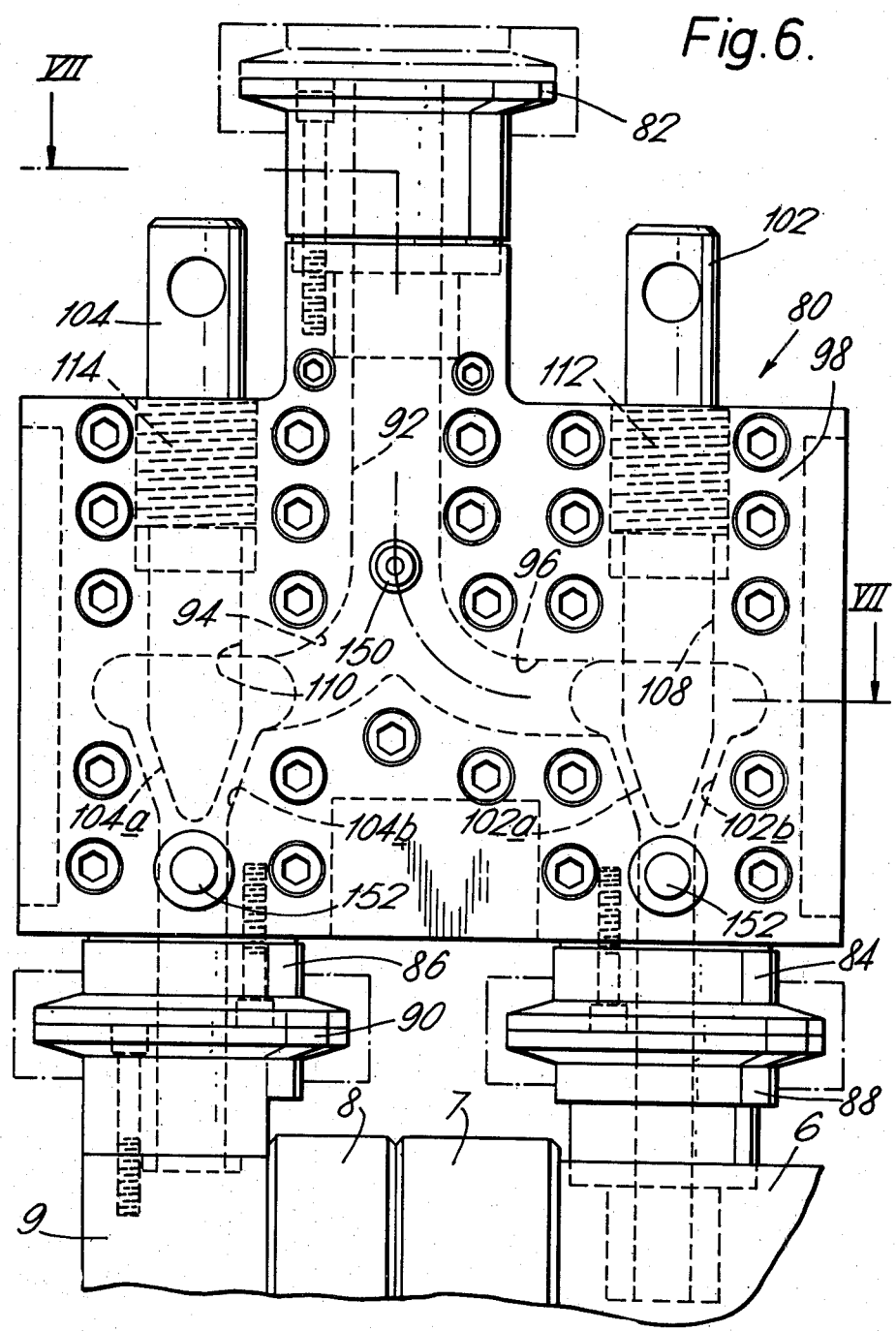

CO-EXTRUSION DIE APPARATUS FOR CO-EXTRUDING PLASTICS MATERIALS

DESCRIPTION OF INVENTION

This invention relates to co-extruding apparatus for extruding plastics products.

It is frequently necessary or desirable to produce plastics products different parts of which have a different composition and/or different characteristics. For example, where the product is a plastics pipe, it may be desired that the exterior of the pipe should be resistant to moisture or sunlight, that the inner surface of the tube be resistant to attack by a particular liquid and that wall of the tube as a whole should have good heat insulating properties. Furthermore, it is clearly advantageous to be able to produce such a product in a single operation rather than in a plurality of successive operations.

It is among the objects of the invention to provide improved means for producing such a product.

According to one aspect of the invention there is provided an extrusion die for use in extruding plastics pipes of the kind comprising a plurality of concentric layers of different composition and/or characteristics, the die comprising a central mandrel and an outer die structure encircling the mandrel and defining, with the mandrel, an annular-section extrusion passage extending to an annular extrusion outlet of the die, and a plurality of supply passages for plastics material, said supply passages communicating with said extrusion passage at different axial positions upstream of their extrusion outlet, at least one said supply passage including, at some position therealong, or at its outlet when it meets said extrusion passage, an annular gap defined between opposing surfaces, one of which is provided by a member which is adjustable transversely of the longitudinal axis of the die.

Such adjustability of said member transversely of the die axis may be used, for example, to vary or eliminate eccentricity of the member with respect to the die axis, and/or to vary the direction, transverse to the die axis, in which the centre of said member is displaced from the die axis, with a view, in each case, to modifying the flow of plastics along the supply passage as desired.

Preferably the or each said supply passage is annular in cross section and in axial section slopes, in the direction of extrusion the extrusion passage, from an inlet end thereof to said extrusion passage, one of the opposing surfaces defining said annular gap being disposed radially outwardly of the other whereby such adjustment of the eccentricity of said member varies the width of said annular gap locally.

Preferably the or each said supply passage is provided in said outer die structure and the respective said adjustable member is in the form of a ring which provides the radially outer surface of the respective annular gap, the ring being adjustably supported by screws extending generally radially through a fixed part of the outer die structure to engage the circumference of the ring.

According to another aspect of the invention there is provided apparatus for use in extruding plastics products of the kind comprising a plurality of layers of different composition and/or characteristics and including an extrusion die having a plurality of supply passages communicating with a common extrusion passage, the apparatus including plastics supply means for supplying plasticised plastics under pressure to said supply passages of the die, said plastics supply means having associated therewith means operable, in use of the apparatus, to effect dynamic adjustment of the thickness of one or more layers of the extruded product.

Said plastics supply means may include plastics supply conduits having adjustable flow controlling valves therein whereby the rates of flow of plastics to the respective supply passages, and hence the thickness of the corresponding layers of the extruded product, may be readily adjusted during operation of the apparatus.

In a preferred form of the apparatus, said supply means includes at least one supply conduit which branches into at least two further supply conduits, each of said further supply conduits being connected with a respective said supply passage of the die, and each of said further supply conduits having a respective flow controlling valve therein.

According to another aspect of the invention, there is provided apparatus for producing an extruded, multi-layered plastics tube according to the first-mentioned aspect of the invention, and in which the eccentricity of each said member is adjusted to secure the desired concentricity of the various layers in the extruded product.

According to yet another aspect of the invention, there is provided apparatus for producing an extruded multi-layered plastics product, according to the second-mentioned aspect of the invention, comprising supplying plasticised plastics material via said supply conduits to said supply passages, to pass in the desired manner to said extrusion passage, and adjusting the thickness of one or more layers of the product extruded, during the extrusion of the product, by operation of said adjustment means associated with the plastics supply means.

According to a yet further aspect of the invention there is provided means for supplying and distributing plasticised synthetic plastics material to an extrusion head, mould, or the like, said means comprising a body providing an inlet passage for plasticised plastics extending from an inlet opening and branching into a plurality of outlet passages leading to respective outlet openings at least one said outlet passage having flow controlling means disposed therein and adjustable to control the flow cross-section through the passage in which it is disposed.

An embodiment of the invention is described below with reference to the accompanying drawings in which:

FIG. 1 is a view in axial section of an extrusion die embodying the invention.

Figure 5:
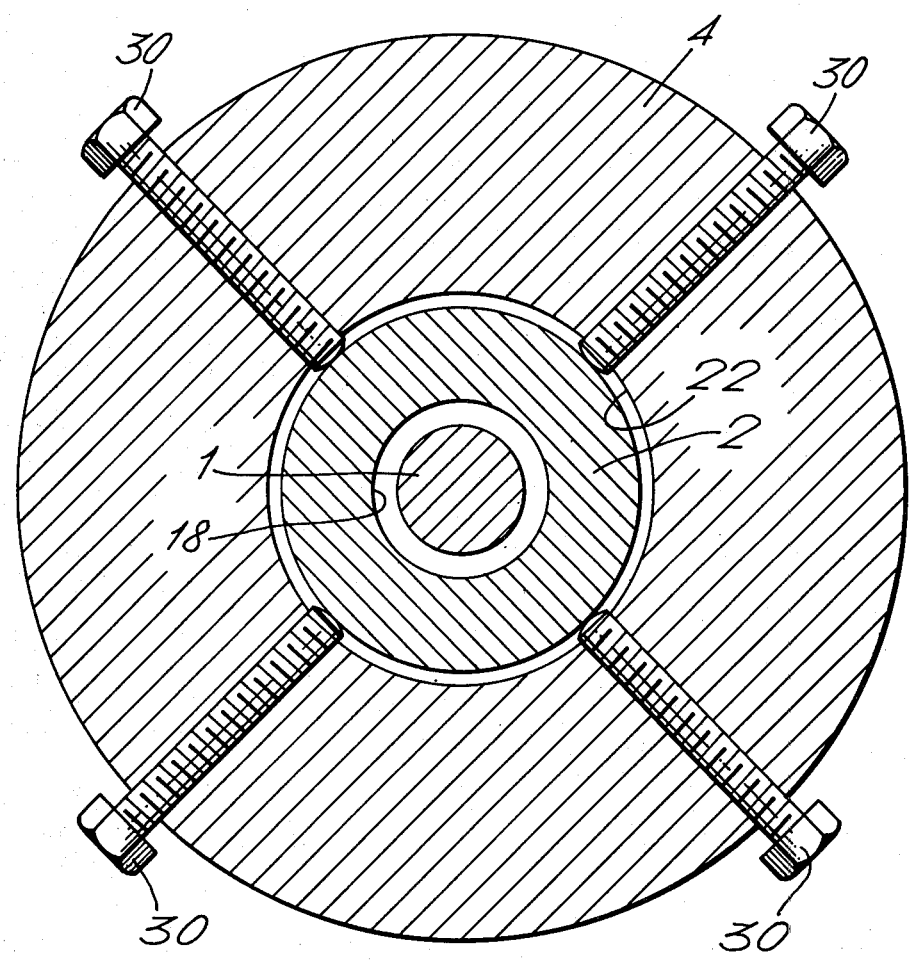

FIG. 2 is a plan view of a member affording plastics supply conduits for the supply of plasticised plastics to the die of FIG. 1, FIG. 3 is a view of the member of FIG. 2, partly in end elevation and partly in section, along the line III-A-B-III in FIG. 2, FIG. 4 is a view of the member of FIG. 2 in section along the line IV-C-D-IV of FIG. 2, and FIG. 5 is a view in cross section along the line V—V of FIG. 1.

Referring to FIG. 1, the die comprises a base member 9 having a first portion in the form of a thick metal disc and a second portion in the form of a cylindrical stem 15 of substantially smaller diameter than the disc extending from one face of the disc, the stem 15 being coaxial with the disc. The forwardmost part of the stem 15, i.e. the part furthest from the said disc, forms a rearward part of a mandrel, the remainder of which is formed by a mandrel part 1 screwed to the front end of the stem 15. The stem 15 and mandrel part 1 are of circular cross section throughout.

Mounted in a stack on the base 9 is a plurality of annular die plates, referenced, in order of increasing distance from the said first portion of the base member 9, 8, 7, 6, 5 and 4. All of these die plates exhibit substantial circular symmetry about the axis of the base member 9 and are provided with interengaging annular shoulders and recesses to ensure that this coaxial relationship is maintained. The plates 4 to 8 and the base member 9 are held together by tie bolts distributed at regular intervals around the circumference of the die, each said tie bolt extending parallel with the die axis through aligned bores in the members 4 to 9.

A front die member 2, in the form of an externally cylindrical forward part extending coaxially from an outwardly cylindrical root part of greater diameter than the forward part is retained in a recess in the die plate 4 by means of a retaining plate 3. The front die part 2 has a central passage therethrough, the portion 16 of said passage which is within the forward portion of the front die part 2 being cylindrical and coaxial with the outer surface of said forward part, whereas the part 18 of said central passage which extends through said root portion of the front die part is frusto-conical in form converging in the forward direction and being coaxial with said cylindrical bore. On the exterior of the front die part, a planar annular shoulder 20 extends between the outer surface of the forward portion of the front die part and the outer surface of the root portion of the front die part.

The recess in the die plate 4 in which the front die part is accommodated is in the form of a cylindrical bore 22 extending axially into the plate 4 from the front face thereof, the diameter of the bore 22 being substantially greater than the external diameter of the root portion of the front die part 2 accommodated therein. The front retaining plate 3 is in the form of an annular disc with planar end faces, the forward portion of the front die part 2 extending through the central aperture in the retaining plate 3 with substantial diametral clearance. The die plate 3 is received snugly in a shallow counterbore 24 extending from the front face of the die plate 4 coaxial with the bore 22, the front retaining plate 3 being clamped to the die plate 4 by means of a plurality of clamping bolts, (not shown), regularly distributed around the retaining plate 3, said bolts extending, parallel with the die axis, through respective bores in the plate 3 and engaging in respective screw threaded bores in the plate 4. When the plate 3 is securely clamped to the die plate 4, there is sufficient axial spacing between the rearwardly directed end face of the plate 3 and the opposing end face of the bore 22 to allow the front die part 2 to slide transversely relative to the die axis without any appreciable play in the axial direction.

As shown in FIG. 5, means is provided for centering the die part 2 with respect to the die plates, or varying the eccentricity of the die part 2 with respect to the die plates, said means comprising four adjustment bolts each received in a respective screw threaded bore extending radially through the die plate 4 into the bore 22 to engage, at its inner end, the periphery of the root portion of the front die part 2. As shown, the bolts 30 are disposed at intervals of 90° around the axis of the die plate 4 and have projecting heads accessible for adjustment. Thus, by appropriate adjustment of the bolts 30 it is possible to secure concentricity of the die part 2 with respect to the parts 4 to 9 or to adjust the eccentricity of the die part 2 with respect to the parts 4 to 9, if a degree of eccentricity is found necessary to compensate for some other factor itself tending to produce an eccentricity in the extruded product.

As shown in FIG. 1, the die plates 4 to 8 and the mandrel 15,1 together define, in conjunction with the front die part 2 and equalisation rings 11 and 12 discussed in more detail below, an annular extrusion passage opening in an annular outlet defined between the mandrel part 1 and the front die part 2.

The die plate 8 comprises a base portion 8a having the general form of a flat disc, the rear face of which engages the front end face of the first part of the base member 9, and a part 8b which has the form of a tubular spigot extending forwardly from the part 8a, the exterior of said spigot tapering frusto-conically in the forward direction. An axial bore 36 extending through the portions 8a and 8b is, over a major part of the length of said bore extending from the rear face of the part 8a, a close sealing fit around the corresponding portion of the part 15. However, at a position spaced slightly rearwardly from the forward end of the part 8b an annular groove 38 is formed in the part 15, defining, with the opposing internal wall of the spigot part 8b an annular plenum chamber 40. The part 15 is reduced slightly in diameter downstream of the groove 38 and the axial bore through the spigot part 8b is enlarged in diameter from the rearwardmost edge of the groove 38 to the front end of the spigot member to define, extending from the plenum chamber 40 to the extrusion passage proper, (which may be regarded as commencing just downstream of the front end of the spigot part 8b), an annular plastics supply passage 41. The plenum chamber 40 is connected via inclined bores 42 in the part 15 with an axial bore 43 extending rearwardly in the base member 9, the bore 43 being connected in turn with a radial bore 44 opening in an inlet orifice on the periphery of the first part of member 9. Thus plasticised plastics material may be supplied to the plenum chamber 40 via the bores 44, 43 and 42 to pass from the chamber 40 to the extrusion passage proper.

A second plenum chamber, 46, is defined partly by an annular groove formed around the spigot portion 8b of the die plate 8 in the front end face of the die plate 8 and partly by an annular groove formed in the die plate 7 and forming the transition between the rear end face of the die plate 7 and the axial passage through the die plate 7, and this plenum chamber 46 is connected with the extrusion passage proper via a passage 48 which is annular in cross section and is of generally frusto-conical form, sloping, in the forward direction from the plenum chamber 46, towards the central axis of the die. The passage 48 is defined between, on the one hand, the outer surface of the spigot part 8b of the die plate 8, and, on the other hand, a part 49 of the passage through the die plate 7, the internal passage through the equalisation ring 11, and the rearward portion of the internal axial passage through the die plate 6, the die plate 6 having a rear face engaging the front face of the die plate 7.

The die plate 6, like the die plate 8, comprises a rear portion 6a in the general form of a flat disc and a spigot portion 6b extending axially forwards from the spigot portion 6a. Once again, the outer surface of the spigot portion 6b is substantially frusto-conical, tapering forwardly from the portion 6a, and in this case the axial bore through the die plate 6 tapers frusto-conically from the rear face of the part 6a to a position somewhat downstream of the position of the front end of the spigot portion 8b, (this tapering portion of the passage through die plate 6a partly defining the radially outer wall of the frusto-conically tapering passage 48, whilst the remainder of the bore through the die plate 6 is substantially cylindrical.

A third annular plenum chamber 50 is defined partly by an annular groove formed in the front face of the disc part 6a around the root of the spigot part 6b and partly by an annular groove formed in the die plate 5 and forming the transition between the rear face of die plate 5 which engages the front face of die plate 6 and the axial passage through the die plate 5. The plenum chamber 50 is also connected with the extrusion passage by a passage 52 of annular cross section tapering forwardly from the plenum chamber 50 towards the die axis, the passage 52 being defined between the outer surface of the spigot part 6b and an opposing, correspondingly frusto-conical surface defined partly by the axial passage through the die plate 5 and partly by the axial passage through the equalisation ring 12.

The equalisation rings 11 and 12 are adjustably mounted in the die in a manner similar to the root portion of the front die part 2. Thus, the rings 11 and 12, which are externally cylindrical and have planar end faces are accommodated in respective radially inwardly open annular channels defined by cylindrical counter bores 56, 54, respectively in the die plates 7, 5 respectively and adjoining rear end faces of the die plates 6, 4 respectively. Each ring 11, 12 has an external diameter substantially smaller than that of the respective bore 56, 54, and is slidable transversely, without appreciable axial play, between the planar end wall of the respective bore 56, 54 respectively and the opposing planar end face of the respective plates 6, 4, said opposing planar faces slidably engaging the opposing planar end faces of the respective rings.

As with the front die part 2, the concentricity or eccentricity of each ring 11, 12, relative to the die axis, is adjustable by means of four adjustment bolts, not shown, the respective set of four adjustment bolts for each ring 11, 12 being distributed at intervals of 90° around the die and being screw-threadedly engaged in respective radial bores in the respective die plates 7, 5, the adjustment bolts of each set extending, at their inner ends, into the respective bore 56, 54, to engage the periphery of the respective ring 11, 12.

It will be noted that, in each of the rings 11, 12, a rearward part of the bore therethrough is frusto-conical, tapering in the forward direction whilst the forward part of the bore therethrough is substantially cylindrical. In the case of the ring 12, the cylindrical portion of the bore through the ring defines the outer wall of the annular extrusion passage proper which lies immediately downstream of the front end of the spigot part 6b, the last mentioned part of the extrusion passage being of greater external diameter than the part immediately upstream provided by the interior of the spigot part 6b. In the case of the ring 11, the cylindrical portion of the bore through the ring, together with a correspondingly cylindrical portion of the bore through die plate 6 adjacent the rear end of the latter, defines, with the opposing frusto-conical outer surface of the spigot part 8b, a section of passage 48 which increases progressively in flow cross-section towards the extrusion passage proper, the flow cross-section of the part of passage 48 downstream of this section being greater than that of the part of passage 48 upstream of this section.

The part of the mandrel provided by the mandrel part 1 tapers inwardly in the forward direction from an axial position corresponding approximately to that of the ring 12 to an axial position immediately upstream of the rearward end of the cylindrical part of the axial bore through the front die part 2, the portion of the mandrel part 1 passing through said cylindrical bore in the die part 2 being externally cylindrical and terminating in a cylindrical end part of reduced diameter projecting from the die opening. The axial passage through the die plate 4, over the region extending from the rear face of the die plate 4 to the root portion of the front die part 2 tapers frusto-conically inwardly in the forward direction as an extension, (when the part 2 is arranged exactly coaxially with the die plate 4) of the frusto-conical surface of the rearward part of the axial passage through the die part 2, the apex angle of the last-mentioned frusto-conical surface being greater than that of the frusto-conical part of the mandrel part 1 so that the annular extrusion passage not only converges towards the axis of the die from the position of the ring 12 to that of the rear end of the cylindrical part of the bore through the die part 2 but also decreases progressively in radial width over this section.

The mandrel 15, 1 is externally substantially cylindrical in the region between the groove 38 and a position just downstream of the front end of the spigot part 6b whilst the outer diameter of the extrusion passage, upstream of the front end of the spigot part 6b and downstream of the front end of the spigot part 8b, (said outer diameter being defined by the cylindrical part of the axial bore through the die plate 6), is somewhat less than the outer diameter of the extrusion passage immediately downstream of the front end of the spigot portion 6b. Similarly, the outer diameter of the annular section passage connecting the plenum chamber 40 with the extrusion passage proper downstream of the front end of the spigot portion 8b, said outer diameter being defined by the spigot portion 8b, is substantially less than the outer diameter of the part of the extrusion passage defined by the spigot portion 6b of the die plate 6.

In operation of the apparatus, plasticised plastics material is supplied to the plenum chambers 40, 46, 50 and passes therefrom along the respective passages 41, 48, 52 to the annular extrusion passage, whilst, due to the noted changes in external diameter of the latter, the flow cross-section of the extrusion passage increases downstream of the point where each of these passages meets the extrusion passage, to accommodate the respective layer of plastics material supplied to the extrusion passage from the respective passage 41, 48, 56.

As noted previously, the die parts 1 to 9 exhibit substantial rotational symmetry although of course, some departure from such symmetry is brought about by the provision of screw-threaded bores for the adjusting bolts. Further departures from such rotational symmetry are due to provisions made for the supply of plasticised plastics material to the plenum chambers. Thus, a bore 60 extends radially inwardly into the die assembly to communicate with plenum chamber 46, the "axis" of the bore 60 lying in the plane of the radially inner part of the joint face between plates 6 and 7. Similarly, a bore 62 extends radially inwardly into the die assembly to communicate with plenum chamber 50, the axis of bore 62 lying in the plane of the radially inner part of the joint face between plates 6 and 7.

Said first portion of the base member 9 is formed, on its periphery, with a flat perpendicular to bore 44 and onto which the bore 44 opens, a counterbore being formed around said bore 44 and extending from said flat. Similarly, the die plates 7, 8 are provided, on their outer peripheries, with co-planar flats together defining a planar surface perpendicular to bore 60 and onto which bore 60 opens, a shallow counterbore being provided around said bore 60 and extending from said planar surface.

Similar co-operating flats are provided on the peripheries of the die plates 5 and 6 and define a planar surface, perpendicular to bore 62 and into which bore 62 opens, a shallow counterbore being provided around bore 62 and extending from said planar surface. In the assembled extrusion apparatus, the radially outer ends of the bores 44, 60 and 62, and the respective shallow counterbores, receive fittings for engagement with means for supplying plasticised plastics material under pressure to the plenum chambers 40, 46 and 50 respectively. It will be noted that the bores 44, 62 lie on a side of the die assembly which is diametrically opposite that on which the bore 60 lies.

Referring to FIGS. 2 to 4, plasticised plastics is supplied to the die of FIG. 1 by supply means including the device 80 shown in FIG. 2. The device 80 includes an inlet fitting 82 adapted to receive an outlet nozzle of a plastics injector (not shown) and two outlet fittings 84 and 86 adapted for sealing engagement with complementary inlet fittings 88 and 90 respectively fitted in the inlets 44 and 62 of the die. Each of the fittings 82, 84, 86, has an axial passage therethrough, and the function of the device 80 is simply to provide a single inlet passage (the inlet to which is afforded by fitting 82) and two branch passages branching from the inlet passage, the branch passages terminating in the fittings 84, 86 respectively, independent flow regulating means being provided in each of the two branch passages.

Referring to FIG. 2, the single inlet passage is indicated in broken lines at 92 while the two branch passages are indicated at 94, 96 respectively.

The major part of the device 80 comprises two similarly profiled superimposed metal plates clamped together by bolts (not shown) the axes of the fittings 82, 86, 84, lying in the parting plane between the two plates. The two plates are referenced 98 and 100 in FIGS. 3 and 4. The passages 92, 94, 96 are defined by co-operating round-bottomed grooves in the opposing faces of the plates 98 and 100. Mounted in the block defined by the two plates 98, 100, and in axial alignment with the respective fittings 84, 86, are flow adjusting members 102 and 104 respectively in the form of generally cylindrical bolts having conically tapering noses 102a and 104a respectively within the block, said noses extending within the respective regions bounded by respective valve seats 102b and 104b formed in the block 98, 100, coaxially with the respective bolts 102, 104, each said surface 102b, 104b, forming part of the respective metering chamber formed in the block 98, 100 by co-operating recesses in the plates 98 and 100, each said valve seat surface namely forming the part of the respective metering chamber leading to the outlet therefrom, which outlet is in the form of a straight passage coaxial with the respective bolt 102, 104 and leading to the outlet of the respective fitting 84, 86. Each bolt 102, 104 is accommodated in a respective coaxial bore, each bolt 102, 104 being sealingly received in a section 108, 110 respectively of its respective bore which opens into the respective metering chamber. Each bolt 102, 104 has, remote from its frusto-conical end, an externally screw-threaded portion 112, 114 respectively of enlarged diameter with respect to the remainder of the bolt and being in screw-threaded engagement with a screw-threaded portion of the respective bore receiving the bolt, the screw-threaded portion of the respective bore extending to the end face of the plates 98, 100 remote from the fittings 84, 86.

Thus, the bolts 102, 104 may be screwed in or out independently of one another to adjust the axial positions of the respective bolts and thus the flow cross section defined between the cooperating frusto-conical surfaces of the nose of the respective bolt and the respective valve seat. The bolts 102, 104 may be fitted with handles to allow such adjustment to be effected manually, but preferably the bolts 102, 104 are coupled to electric motors whereby adjustment may be made automatically, during operation of the apparatus.

The specific form of the apparatus shown in the drawings is intended for the extrusion of a plastics pipe having an unfoamed inner layer, and unfoamed outer layer and a foamed, heat-insulating intermediate layer. The device of FIGS. 2 to 4 is used in conjunction with the die of FIG. 1 when it is desired that the inner and outer layers should be of the same material.

The material for the inner layer is supplied to the plenum chamber 40 via the passages 43 and 44 whilst the material for the outer layer is supplied to the plenum chamber 50 via the bore 62 or a fitting, such as the fitting 88, received therein. The material for the foamed intermediate layer, comprising a plasticised plastics material with a foaming agent is supplied under pressure to the plenum chamber 46 via a fitting (not shown) fitted in the bore 60 in the same way as the fittings 88, 90 may be fitted in the bores 62, 44. The relatively rapid increase in the flow cross section of the passage 48 leading from the plenum chamber 46, in the region of the junction between ring 11 and the die plate 6 promotes foaming of the plastics material passing along the passage 48 before it encounters the plastics material from the plenum chambers 40, 50.

The adjustable bolts 102, 104 allow the radial thickness of each of the three layers of the pipe to be varied during extrusion of the pipe from the opening between the mandrel part 1 and the die part 2, since by adjustment of both bolts 102, 104, simultaneously, the flow rate of the plastics material supplied to the die via passage 92 and fittings 84, 86 may be adjusted relative to the flow rate of the foamable plastics material supplied to the plenum chamber 46, whilst the thickness of the outer layer relative to the inner may be adjusted by adjustment of one of the bolts 102, 104 or adjustment of both bolts in contrary senses.

Control of the extrusion process is assisted by sensing the fluid pressure in the outlet part of the extrusion passage by means of a pressure transducer.

It should be noted that ideally, the materials of the various layers of the extruded pipe should be selected in accordance with their desired function, and in certain instances considerations of adhesive compatibility between the substances of the various layers and the convenience of using the same plastics material for the inner and outer layer of the pipe must be regarded as secondary. Thus, the internal wall of the extruded pipe has to withstand the surface pressures or pressures of fluids passing therethrough and may also be required to be resistant to attack by specified fluids, whereas the outer wall of the pipe may be required to be abrasion resistant or resistant to various weather conditions or soil conditions or the like, and it may be necessary to select a different plastics material for each of the layers. In such a case, of course, each of the passages 44, 60, 62 would be supplied from a respective injector for supplying the respective plastics material under pressure. Where adhesion between adjoining layers would be likely to be poor, it is contemplated that the die might be subdivided still further to provide, between the plenum chambers for the material of the incompatible layers, a further plenum chamber, communicating with the extrusion passage proper via a respective annular flow passage opening into the extrusion passage at a positive intermediate the positions where the flow passages for the materials of the incompatible layers open into the extrusion passage, the adhesive being selected to have a good adhesion with the material of either layer, so that during extrusion the inner of the two layers is coated with adhesive before the application of the outer of the two layers, thereby securing adequate bonding between the layers.

On the same basis, it will be appreciated that by extending the structure of the die to incorporate further plenum chambers with further supply passages and flow passages leading to the extrusion passage, a product comprising any desired numbers of layers may be extruded in one step.

If desired, the device of FIGS. 2 to 4 may incorporate, for purposes of monitoring and control, a temperature sensing device, such as a thermocouple, for sensing the temperature in the passage 92 upstream of the valve seats 102a and 104a, and/or a respective pressure transducer for sensing the fluid pressure in the respective straight passage leading to the outlet of the respective fitting 84 or 86.

Figure 8:
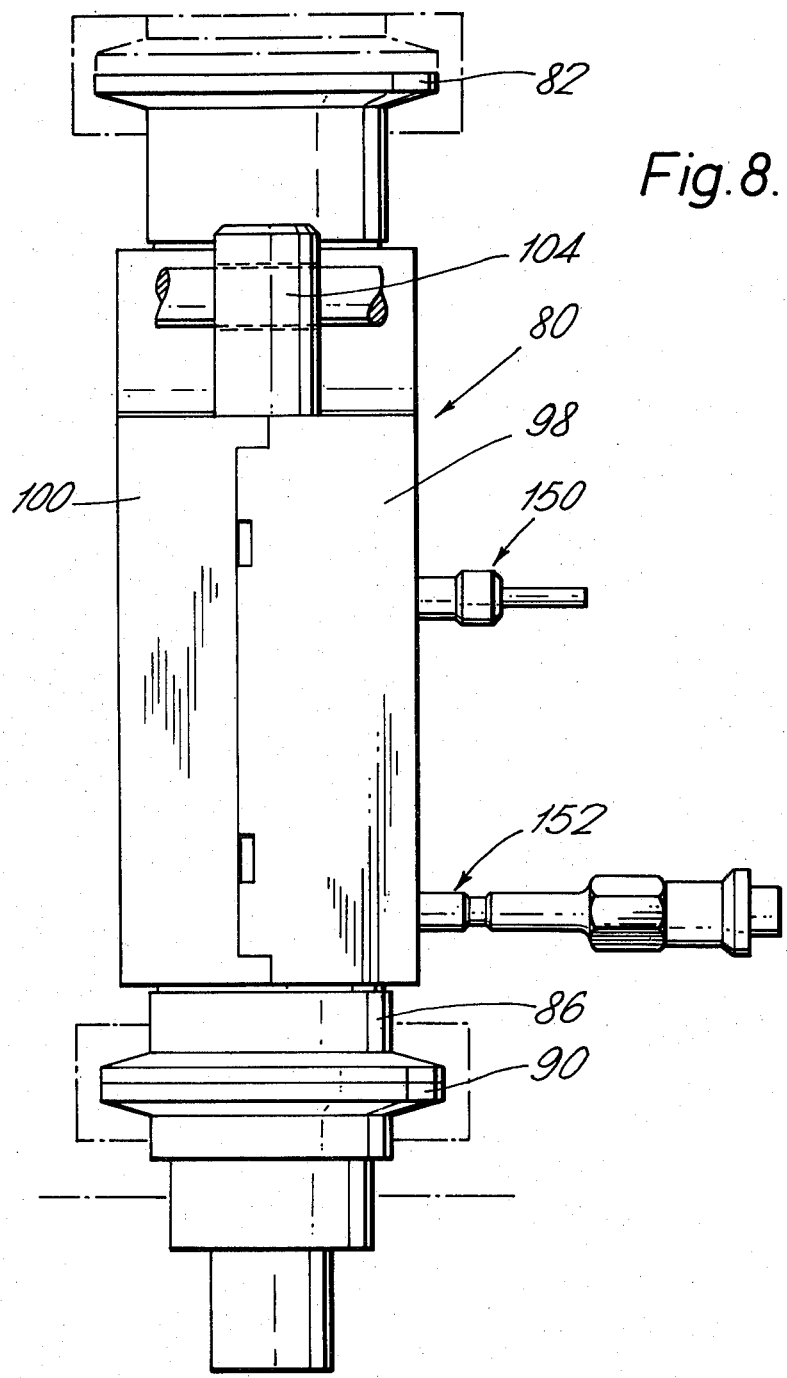

A variant of the device of FIGS. 2 to 4, incorporating such a thermocouple 150 and such pressure transducers 152, is shown in the accompanying FIGS. 6 to 8.

I claim:

1. An extrusion die for use in extruding hollow plastics products of the kind comprising a plurality of concentric layers of different composition and/or characteristics, the die comprising a central mandrel extending along a longitudinal axis of the die and having a tip portion and an outer die structure encircling the mandrel, the die having an annular extrusion outlet and an annular-section extrusion passage extending to said annular extrusion outlet, said extrusion passage being defined between the mandrel and the outer die structure, said annular extrusion outlet of the die being defined by said outer die structure around said tip portion of the mandrel, the die having therein a first annular plenum chamber encircling the mandrel, a first portion of said extrusion passage extending from said first plenum chamber towards said extrusion outlet, the die further having therein a second annular plenum chamber, encircling the longitudinal axis of the die and disposed at a position which is further along said longitudinal axis from said extrusion outlet than said first annular plenum chamber, and an annular-section supply passage, also encircling said longitudinal axis of the die and extending from the second plenum chamber to meet said annular section extrusion passage in a junction therewith which is closer to said annular extrusion outlet than said first plenum chamber, an annular slot extending around the wall of the extrusion passage and providing the junction between the extrusion passage and said annular-section supply passage which extends from said second plenum chamber, the die including a duct extending through part of said mandrel to the first annular plenum chamber for the supply of plastics thereto, and a further duct extending to said second plenum chamber for the supply of plastics thereto, said outer die structure comprising a plurality of interengaged annular members each having a central axial opening through which the mandrel extends, a first said annular member having a portion, more remote from the extrusion outlet, which closely embraces the mandrel and a portion, nearer the extrusion outlet, which is spaced radially outwardly from the mandrel, to define, with the mandrel, said first annular plenum chamber and said first portion of said annular extrusion passage, said first annular member including a part extending from an axial position further from said annular extrusion outlet than said first plenum chamber, towards said extrusion outlet and which part tapers externally in the direction towards said extrusion outlet, an annular lip being formed at the end of said externally tapering part which is nearest the extrusion outlet, said annular lip encircling and being spaced from the mandrel, said tapering part of said first annular member defining the radially inner wall of the annular-section supply passage which extends from the second plenum chamber, a further portion of said die structure defining the opposing radially outer wall of said supply passage, said outer wall also decreasing in diameter in the direction towards the extrusion outlet, said further portion of said die structure including at least one further said annular member engaging said first annular member and defining therewith said second annular plenum chamber, the die further including a control ring incorporated in said outer die structure, the annular-section supply passage which extends from the second plenum chamber including an annular gap defined between said tapering portion of the first annular member and said control ring incorporated in said outer die structure, means being provided for adjustment of said control ring transversely of the longitudinal axis of the die.

2. The extrusion die of claim 1, which has therein a further annular-section supply passage for plastics material, communicating with said extrusion passage at an axial position nearer said extrusion outlet than said annular slot via which the first-mentioned annular-section passage communicates with the annular extrusion passage, said further supply passage having a radially inner wall and a radially outer wall, a further annular plenum chamber in said die, said further annular-section supply passage extending to said extrusion passage from said further annular plenum chamber, the die further including a yet further duct extending to said further annular plenum chamber, said outer die structure including a further said annular member having a part tapering externally in the direction towards said extrusion outlet, and a yet further part of the die structure which tapers internally in the direction towards said extrusion outlet, said radially inner wall of said further supply passage being defined by an externally tapering part of said further annular member and said radially outer wall of said further supply passage being defined by the tapering interior of said yet further part of the die structure, and said further annular plenum chamber being defined between said further annular member and said yet further part of the die structure.

3. An extrusion die according to claim 2 wherein said outer die structure includes a second said annular member adjoining said first annular member, said first-mentioned supply passage has an upstream part and a downstream part, and the further said annular member which partly defines said further annular supply passage has an internal wall tapering in the direction towards said extrusion outlet, said second annular plenum chamber and said upstream part of the first-mentioned supply passage being defined between said first annular member and said second annular member, and said downstream part of the first-mentioned supply passage being defined between said first annular member and said tapering internal wall formed in the said further annular member which partly defines said further annular supply passage and wherein said tapering internal wall of said further annular member extends, in the direction towards the extrusion outlet, closer to said extrusion outlet than the limit, furthest from the extrusion outlet, of said externally tapering part of said further annular member, said further annular member being engaged with said second annular member, said second and said further annular members having axially opposing parts defining therebetween a groove in which said control ring in the first-mentioned annular supply passage is located with radial clearance.

4. An extrusion die according to claim 1 wherein the outer die structure provides, for each said control ring, a respective groove in which the respective control ring is disposed with radial clearance on its outer periphery, and wherein for each said groove the outer die structure defines a plurality of screw-threaded bores extending radially into the respective groove from the exterior of the die and spaced apart angularly about the die axis, the die including, for each said groove, a corresponding plurality of set-screws screw threadedly engaged in respective said bores and extending radially into the respective groove from the exterior of the die to engage the periphery of the respective control ring, whereby the respective said control ring can be adjusted in any desired direction perpendicular to the die axis.

5. An extrusion die according to claim 4 wherein there are four such set screws for each control ring, the set screws being spaced apart at 90 degree intervals around the axis of the die.

6. An extrusion die for use in extruding hollow plastic products of the kind comprising a plurality of concentric layers, the die comprising:
 a mandrel extending along the longitudinal axis of the die, said mandrel having a forward tip portion;
 an outer die structure surrounding the mandrel;
 said die structure and mandrel defining an extrusion passage therebetween which is annular in cross section and which extends forwardly along the longitudinal axis of the mandrel from an intermediate portion of the mandrel to an annular extrusion opening at the tip portion of the mandrel;
 a first material receiving plenum defined by said mandrel and outer die structure, said first plenum communicating with the extrusion passage, said mandrel defining a first internal material supply duct communicating with the first plenum, such that material passing through the first supply duct reaches the first plenum and passes through the extrusion passage to the annular extrusion opening;
 a second material receiving plenum defined by said outer die structure, said second plenum being positioned rearwardly of the first plenum, said outer die structure defining a material delivery passage communicating from the second plenum to the extrusion passage at a location forwardly of the first plenum, said outer die structure defining a second material supply duct communicating with the second plenum, such that material passing through the second supply duct reaches the second plenum and passes through the material delivery passage and the extrusion passage to the annular extrusion opening.

7. An extrusion die according to claim 6 in which said first and second plenums are annular and in which said material delivery passage is also annular.

8. An extrusion die for use in extruding hollow plastic products of the kind comprising a plurality of concentric layers, the die comprising:
 a central, elongated, longitudinal mandrel, said mandrel having a forward tip portion;
 an outer die structure surrounding the mandrel;
 said die structure and mandrel defining an extrusion passage therebetween which is annular in cross section and which extends forwardly along the longitudinal axis of the mandrel from an intermediate portion of the mandrel to an annular extrusion opening at the tip portion of the mandrel, the extrusion passage being enlarged at its rearward end so as to comprise a first annular material receiving plenum;
 means defining a first material supply duct through which material is delivered to the first plenum;
 said die structure defining a first material delivery passage which is positioned radially outwardly from the first plenum, the first material delivery passage being of annular cross section and extending forwardly from a first location which is rearwardly of the first plenum to a second location which is forwardly of the first plenum, the first material delivery passage communicating with the extrusion passage at the second location, the first material delivery passage being enlarged at the first location so as to comprise a second annular material receiving plenum;
 means defining a second material supply duct through which material is delivered to the second plenum;
 said die structure also defining a second material delivery passage partially surrounding said first material delivery passage, the second material delivery passage being of annular cross section and extending forwardly from a third location which is rearwardly of the second location to a fourth location which is forwardly of the second location, the second material delivery passage communicating with the extrusion passage at the fourth location, the second material delivery passage being enlarged at the third location so as to comprise a third annular material receiving plenum; and
 means defining a third material supply duct through which material is delivered to the third plenum.

* * * * *

UNITED STATES PATENT AND TRADEMARK OFFICE
CERTIFICATE OF CORRECTION

PATENT NO. : 4,365,949
DATED : December 28, 1982
INVENTOR(S) : David D. Nash

It is certified that error appears in the above—identified patent and that said Letters Patent is hereby corrected as shown below:

Column 2, line 8, "thickness" should be --thicknesses--.

Column 5, line 3, after "48" insert --)--.

Column 6, line 61, omit "the" first occurrence.

Column 9, line 12, "positive" should be --position--.

Signed and Sealed this

Third Day of May 1983

[SEAL]

Attest:

GERALD J. MOSSINGHOFF

Attesting Officer    Commissioner of Patents and Trademarks